(12) United States Patent
De Vries et al.

(10) Patent No.: US 10,351,104 B2
(45) Date of Patent: Jul. 16, 2019

(54) CONTROL UNIT FOR A WINDSCREEN WIPER SYSTEM FOR A RAIL VEHICLE AND METHOD FOR OPERATING A WINDSCREEN WIPER SYSTEM FOR A RAIL VEHICLE

(71) Applicant: KNORR-BREMSE SYSTEME FÜR SCHIENENFAHRZEUGE GMBH, Munich (DE)

(72) Inventors: Gerhardus De Vries, Mödling (AT); Oswald Amtmann, Bruck/Leitha (AT)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 0 days.

(21) Appl. No.: 15/027,122

(22) PCT Filed: Oct. 1, 2014

(86) PCT No.: PCT/EP2014/071047
§ 371 (c)(1),
(2) Date: Apr. 4, 2016

(87) PCT Pub. No.: WO2015/049290
PCT Pub. Date: Apr. 9, 2015

(65) Prior Publication Data
US 2016/0250998 A1    Sep. 1, 2016

(30) Foreign Application Priority Data

Oct. 2, 2013    (DE) .......................... 10 2013 220 109

(51) Int. Cl.
*B60S 1/08*    (2006.01)
*B60S 1/10*    (2006.01)

(52) U.S. Cl.
CPC ........... *B60S 1/0807* (2013.01); *B60S 1/0818* (2013.01); *B60S 1/10* (2013.01)

(58) Field of Classification Search
CPC ..................................................... B60S 1/0807
See application file for complete search history.

(56) References Cited

U.S. PATENT DOCUMENTS 5,117,168 A * 5/1992 Nomura ................ B60S 1/0818
318/444
5,216,341 A * 6/1993 Nomura ................ B60S 1/0818
318/444

(Continued)

FOREIGN PATENT DOCUMENTS

CN    2900270 Y    5/2007
DE    4221972 A1    1/1994

(Continued)

OTHER PUBLICATIONS

German examination report dated Jun. 4, 2014.
Search report for International Patent Application No. PCT/EP2014/071047; dated Dec. 11, 2014.

*Primary Examiner* — Hussein Elchanti
*Assistant Examiner* — Michael A Berns
(74) *Attorney, Agent, or Firm* — Barnes & Thornburg LLP (57) ABSTRACT

The invention relates to a control unit for a windscreen wiper system for a rail vehicle, comprising an operating function interface, a sensor interface, a control device, a control output, and a supply voltage terminal. The operating function interface is configured to receive an information via an operating mode of the windshield wiper system. The sensor interface is configured to receive at least one analog and/or digital sensor signal. Utilizing the information, the control device is configured to provide at least one control signal for the windshield wiper system via the operating mode and/or (Continued)

the sensor signal. The control output is configured to emit the at least one control signal. The supply voltage terminal is configured to provide an applied voltage, interfaces, and devices of the control unit, in particular to the control device.

14 Claims, 6 Drawing Sheets

(56) References Cited

U.S. PATENT DOCUMENTS

| | | | |
|---|---|---|---|
| 5,404,085 A | 4/1995 | Resch et al. | |
| 5,979,610 A * | 11/1999 | Hooghiem | B61H 7/08 |
| | | | 188/165 |
| 6,121,741 A | 9/2000 | Berger et al. | |
| 6,400,111 B1 | 6/2002 | Detar | |
| 6,851,157 B2 * | 2/2005 | Zimmer | B60S 1/0896 |
| | | | 15/250.13 |
| 7,009,355 B2 * | 3/2006 | Heo | B60S 1/0818 |
| | | | 318/445 |
| 7,196,305 B2 * | 3/2007 | Shaffer | B60S 1/08 |
| | | | 250/208.1 |
| 8,441,221 B2 * | 5/2013 | Teder | B60S 1/0803 |
| | | | 318/643 |
| 8,576,083 B2 * | 11/2013 | Pearson | B60S 1/0825 |
| | | | 318/483 |
| 2013/0203400 A1 * | 8/2013 | Ricci | H04W 4/046 |
| | | | 455/418 |
| 2015/0166014 A1 * | 6/2015 | Amagasa | B60S 1/08 |
| | | | 701/49 |

FOREIGN PATENT DOCUMENTS

| | | |
|---|---|---|
| DE | 19725351 C1 | 10/1998 |
| DE | 69608971 T2 | 3/2001 |
| DE | 102005057703 A1 | 6/2007 |
| GB | 2311208 A | 9/1997 |
| WO | 9710977 A1 | 3/1997 |
| WO | 2012120248 A1 | 9/2012 |
| WO | 2014076220 A1 | 5/2014 |

* cited by examiner

CONTROL UNIT FOR A WINDSCREEN WIPER SYSTEM FOR A RAIL VEHICLE AND METHOD FOR OPERATING A WINDSCREEN WIPER SYSTEM FOR A RAIL VEHICLE

PRIORITY CLAIM

This application includes subject matter similar to the subject matter described in the following co-owned applications: U.S. application Ser. No. 14/484,119, filed Sep. 11, 2014, entitled "Methods System and Articles of Manufacture for Using a Predictive Model to Determine Tax Topics Which are Relevant to a Taxpayer in Preparing an Electronic Tax Return", U.S. application Ser. No. 14/530,305, filed Oct. 31, 2014, now U.S. Pat. No. 10,013,721, issued Jul. 3, 2018, entitled "Identification of Electronic Tax Return Errors Based on Declarative Constraints", U.S. application Ser. No. 14/530,369, filed Oct. 31, 2014, entitled "Predictive Model Based Identification of Potential Errors in Electronic Tax Return", U.S. application Ser. No. 14/674,582, filed Mar. 31, 2015, entitled "Methods, Systems and Computer Program Products for Calculating an Estimated Result of a Tax Return", U.S. application Ser. No. 14/607,935, file Jan. 28, 2015, entitled "Methods and Systems for Identifying Product Defects Within a Tax Return Preparation System", and U.S. application Ser. No. 14/698,645, filed Apr. 28, 2015, entitled "Systems for Identifying Abandonment Indicators for an Electronic Tax Return Preparation Program." The contents of which are fully incorporated herein by reference.

FIELD

Disclosed embodiments relate to a control unit for a windscreen wiper system for a rail vehicle, to a corresponding method for operating a windscreen wiper system for a rail vehicle and also to a corresponding computer program product.

BACKGROUND

Controls for windscreen wiper washing systems are known from the automotive and rail vehicle sectors. In the area of urban rail systems or LRVs (LRV=Light Rail Vehicle), such as on the tramways and metro, the vehicle is supplied with power from 24 V batteries with a rated voltage of 24 V, plus the usual tolerances. In this vehicle segment, windscreen wiper motors with a rotating direction of movement and downstream lever kinematics are used with preference. These motors generally have two basic speeds, the choice of speed being made by way of a further carbon brush that is arranged offset on the circumference of the commutator. These motors also have a device referred to as a "parking plate", by which a parking position in the form of an opening contact on the circumference can be moved to. The DC motors available for industrial applications are not suitable for the application as a windscreen wiper drive if at least two speeds are required.

In the case of electrical multiple units, diesel-operated railcars or high-speed trains, the battery voltage is generally more than 24 V. Typical voltages in the case of the rail vehicles mentioned are 72 V, 96 V and 110 V DC. In order to make industrial motors suitable for the application as a windscreen wiper drive, a special control unit with a controllable voltage output is required.

In the case of the windscreen wiper drives used in the automotive sector, the only position detection is by the "parking plate" in the parking position. If the wiper arm is hindered in the course of movement, a defect to the windscreen wiper drive can only be prevented by thermal monitoring in the motor or sensing and monitoring of the motor current.

Windscreen wiper drives for use in the area of urban rail systems or LRVs (LRV—light rail vehicle) preferably consist of special windscreen wiper motors with three electrical connection points. This third brush, which is mounted offset on the circumference, allows part of the armature winding of the permanently excited motor to remain deenergized. As a result, a lower rotational speed is obtained at the motor. The rotational turning movement of the motor is converted by lever kinematics into a wiping movement. These motors generally have what is known as a "parking plate", with which a switch is opened in a specially designated position of the drive output. The "parking plate" consists of at least one switching contact and a conductor track area on an insulating plate moving with the drive. This conductor track area is interrupted at one or more locations. If this interruption takes place during the operation of the drive, the electrical contact opens and the drive can consequently be switched off in the parking position. The activation of the speed stages takes place by an operator switch. Interval functions are realized by their own timer assemblies (for example: time-lag relays).

Disk-rotor motors with a reversing drive, which have a motor controller of their own on the drive, are also known from the automotive sector. The operating preselection is made here in the form of a digital, analog or digitally coded signal as "slow wiping" or "fast wiping".

SUMMARY

Disclosed embodiments provide an improved windscreen wiper system for a rail vehicle and also an improved method for operating a windscreen wiper system.

Disclosed embodiments use a control unit for a windscreen wiper system for a rail vehicle, a method for operating a windscreen wiper system for a rail vehicle and also a corresponding computer program product.

BRIEF DESCRIPTION OF THE FIGURES

Disclosed embodiments are explained more specifically below with reference to the accompanying drawings, in which.

In the description that follows of the disclosed embodiments, the same or similar designations are used for the elements that are represented in the various drawings and act in a similar way, without the description of these elements being repeated.

DETAILED DESCRIPTION

In the area of rail vehicles, various windscreen wiper systems are used. The drive for these may take place both electrically and electropneumatically. To make them more flexible in terms of use, a sensor can be used for example to detect rain on a windscreen or determine a position of a windscreen wiper. At the same time, a corresponding supply part of a control unit for a windscreen wiper system may compensate for any variance and tolerance of an applied supply voltage.

A control unit for a windscreen wiper system for a rail vehicle has the following features: an operating function interface, the operating function interface being designed for receiving an item of information about an operating mode of the windscreen wiper system; a sensor interface, which is designed for receiving at least one analog and/or digital sensor signal; a control device, which is designed for providing at least one control signal for the windscreen wiper system by using the information about the operating mode and/or the sensor signal; a control output, which is designed for outputting the at least one control signal; and a supply voltage connection, which is designed for providing an applied voltage to interfaces and devices of the control unit, in particular the control device.

A rail vehicle may be understood in general as meaning a track-bound vehicle, such as a locomotive, a multiple unit, a railcar, a tram, an underground rail vehicle, a carriage such as a passenger train carriage and/or a freight car. In particular, the rail vehicle may be a high-speed rail vehicle. In a further embodiment, the windscreen wiper system may also be used for a commercial vehicle and/or an industrial truck. A windscreen wiper system may be understood as meaning a windscreen wiper drive. The rail vehicle may have at least one electrical or electropneumatic windscreen wiper drive. A pneumatic system may be understood as meaning a device that uses compressed air for performing mechanical work. The pneumatic system may drive a drive.

A windscreen wiper system or a windscreen wiper drive may be understood as meaning a drive for a windscreen wiper or a wiper drive. The drive may move a windscreen wiper and be designed to bring about linearly oscillating axial movements of the wiper shaft. An alternating rotational movement may be understood as meaning a linearly oscillating axial movement of a shaft, in particular a wiper shaft. A windscreen wiper may be understood as meaning a device for cleaning a window, in particular a front windscreen, for example of a rail vehicle. A windscreen wiper may consist of a wiper arm, a wiper blade, a wiper spindle and a drive.

An operating mode of the windscreen wiper system may be understood as meaning a preselection of the operating mode, such as for example parking, interval with multiple stages, wiping with multiple stages, rain sensor operation or continuous operation. In this case, an item of information about the operating mode may be received or read in as a signal by way of the operating function interface. An item of information about the operating mode may be understood as meaning an operating mode signal. An analog sensor signal may be understood as meaning a voltage signal, which represents a physical variable sensed by a sensor. A digital sensor signal may be understood as meaning a TTL signal or digital signal, which represents a physical variable sensed by a sensor. In this case, the sensor may be a rain sensor or an angle of rotation sensor.

The control device may be understood as meaning a microcontroller or a digital computing unit. The control device may be designed for receiving and outputting analog or digital signals. A signal output may be understood as meaning an interface which is designed for providing a control signal. A supply voltage connection may be understood as meaning an interface which is designed for providing a constant voltage to the control device, the sensor interface and also the operating function interface. The supply voltage connection may be designed for receiving a voltage in a predefined voltage range, in particular in a voltage range between 24 V and 110 V DC, with corresponding tolerances, and providing a constant, in particular stable, voltage.

Furthermore, the control output may be designed for outputting at least one pulse-width-modulated signal in order to drive at least one electric motor. The control output may be designed for outputting a plurality of digital signals in order to activate at least one solenoid valve of an electropneumatic windscreen wiper drive. If the windscreen wiper system comprises an electrical drive, the electrical drive may be activated by way of a pulse-width-modulated signal. If the windscreen wiper system comprises an electropneumatic drive, it may be activated by way of a digital signal or a plurality of digital signals. In this case, the digital signal or the plurality of digital signals may be pulse-width-modulated signals. If a plurality of digital signals are output at the control output, they may be designed for activating a multi-quadrant chopper, in particular a four-quadrant chopper.

In one embodiment, the sensor interface comprises at least one switchable supply connection for an angle of rotation sensor and at the same time or alternatively for a rain sensor. By way of the supply connection, a supply voltage can be provided for the angle of rotation sensor or the rain sensor. In general terms, a sensor can be supplied by way of the sensor interface.

It may be useful if the operating function interface and in addition or alternatively the sensor interface is/are formed as a bus interface, in particular as an LIN bus interface. By way of a bus interface, corresponding bus sensors can be easily and efficiently connected to the control unit. An LIN bus interface or a CAN bus interface may be used as the bus interface. In this case, the bus interface may comprise the operating function interface and also the sensor interface. In this case, the bus interface may be of a bidirectional form.

The operating function interface and at the same time or alternatively the sensor interface may be designed for receiving at least one current signal of between 0 mA and 20 mA and alternatively or in addition at least one voltage signal and alternatively or additionally at least one PWM signal and/or for evaluating them in accordance with an evaluation specification. The operating function interface and also the sensor interface may be formed as an analog, digital or bus interface. An evaluation specification may be understood as meaning an algorithm or a processing specification which makes it possible to extract items of information contained in a received signal. In this case, the operating function interface and also the sensor interface may also be of a hybrid form, that is to say that both analog and digital signals can be received or output.

The control unit may have a housing, it being possible for the housing to be produced from steel sheet and at the same time or alternatively from stainless material. The housing may have a surface protection. The housing allows the control unit to be protected from environmental influences for use in a rail vehicle. At the same time, the housing can create a mechanically stable configuration of the control unit.

A method for operating a windscreen wiper system for a rail vehicle in accordance with disclosed embodiments may include: reading in an operating mode signal, the operating mode signal representing an item of information about an operating mode to be controlled of the windscreen wiper system; creating a control signal by using the operating mode signal; and outputting the control signal to the windscreen wiper system as an analog and/or digital signal.

The method for operating a windscreen wiper system for a rail vehicle also allows the idea on which the disclosed embodiments are based to be implemented efficiently. The method can be performed while the rail vehicle is in motion.

In the reading-in operation a sensor signal may be read in, while in the creating operation the control signal is created by using the sensor signal. The sensor signal may be understood as meaning a signal of an angle of rotation sensor or of a rain sensor. Consequently, by using an item of information of the rain sensor, the control signal can in interval mode create the length of the pauses in dependence on a rain intensity or can in continuous mode create the rotating speed of the wiper blades in dependence on the rain intensity.

The method for operating a windscreen wiper system may comprise a operation of providing a supply voltage for a sensor. This allows activation of a sensor which requires a supply of voltage of its own for its operation of sensing a physical variable.

The control device of the control unit for a windscreen wiper system for a rail vehicle may be designed for carrying out or implementing the operations of a variant of a method presented here in corresponding devices. This variant of an embodiment in the form of a control device can also achieve the utility of the disclosed embodiments quickly and efficiently.

A control device or a control unit may be understood in the present case as meaning an electrical unit which processes sensor signals and outputs control and/or data signals in dependence on the sensor signals. The interfaces of the control device may be of a hardware and/or software form. In the case of a hardware form, the interfaces may for example be part of what is known as a system ASIC, which comprises a wide variety of functions of the control device. The interfaces may however also be formed as integrated circuits of their own or at least partially consist of discrete components. In the case of a software form, the interfaces may be software modules which are for example present on a microcontroller along with other software modules.

In accordance with the disclosed embodiments, a computer program product with program code, which may be stored on a machine-readable carrier such as a semiconductor memory and is used for carrying out the method based on one of the embodiments described above when the computer program product may be executed on a control device.

In accordance with disclosed embodiments, a control unit may consist of a populated conductor card that is installed in a metal housing. The metal housing may be made here from steel sheet with corresponding surface protection or from stainless material. The control unit also has one or more plug-in connections for the connection of the supply and discharge lines. One advantage here, depending on the embodiment, is the combination of inputs and outputs and the processing of digital and analog input signals, such as for example an angle of rotation sensor, rain sensor and items of information of other windscreen wiper system components, such as for example further control units for the synchronization of two or more wiper drives.

The control units with single-quadrant or multi-quadrant PWM make possible the use of industrial drives, such as for example permanently excited DC drive motors with brushgear. The restriction to specific windscreen wiper motors, which generally consist of a DC motor with three carbon brushes, a worm gear and a "parking plate", is consequently not required. When supplying by means of PWM, an adaptation of the wiping speed is possible; so too is a constant wiping speed, even when there are different frictional states on the vehicle windscreen to be wiped.

A variant of a control unit presented here can be advantageously used in windscreen wiper systems for all types of rail vehicles.

In one embodiment, the control unit may consist of an electronic circuit with a microcontroller and with multiple inputs for the preselection of the operating modes and multiple outputs, and also supply voltage connections. Operating modes may be understood as meaning parking, interval with multiple stages, wiping with multiple stages and rain sensor operation.

Furthermore, the control unit may be formed with a single- or multi-quadrant PWM output for operation on an industrial motor in the application as a windscreen wiper motor for rail vehicles.

For use with an electropneumatic windscreen wiper drive, the control unit may comprise multiple digital outputs for the connection of solenoid valves of an electropneumatic windscreen wiper drive.

In one embodiment, the control unit may comprise deactivatable supply connections for the connection of the angle of rotation sensor and at the same time or alternatively the rain sensor, with voltage levels that are adapted in accordance with the requirements and stabilized.

The control unit may have a standard current signal input of 0 to 20 mA for processing the position signal of the angle of rotation sensor. In this way, the position of the wiper arm and of the wiper blade is known at every point in time. Any blockage or hindrance of the wiper arm or the wiper blade can be detected immediately, long before switching off of the drive motor takes place as a result of excessive temperature or overload.

In one embodiment, the control unit may comprise an analog input for processing the PWM or switching signal of commercially available rain sensors with an analog output. The input may consist here of an RC low-pass filter, the RC low-pass filter being able to transform the signal voltage into a continuous signal and prepare it for the microcontroller. When using rain sensors with an LIN bus or CAN bus, a signal conversion into an analog signal is also possible, or a direct connection when using an LIN bus or CAN bus connection on the control electronics.

Alternatively or in addition to the sensor interface, in particular a sensor interface of an analog form, the control unit may have at least one LIN data bus connection, in order to read in or activate an LIN bus rain sensor or some other LIN bus sensor or actuator.

It may also be useful if the control unit has a device for forming synchronized wiper drives, a control unit respectively operating a wiper drive. A synchronization may take place with preference in the reversal position. Here, the first of the wiper drives to be synchronized that reaches the reversal position may be stopped there until all of the further wiper drives have also reached the reversal position. Only from this point in time can the next wiping movement of the wiper drives take place. Should there be a complete failure or a hindrance other than a temporary hindrance of one of the wiper drives, it is also possible in dependence on the programming of the control units for partly synchronous operation to take place in the case of at least three wiper drives to be synchronized, or the synchronization to be suspended in the case of two wiper drives. As soon as all of the wiper drives to be synchronized are fully functional again, the complete synchronization can be carried out again. For this synchronization, in the case of two wiper drives for example, an exchange of information may take place in such a way that one digital signal gives the movement of the wiper drive and a second signal gives the reaching of the synchronization position. Apart from the synchronization in the synchronization position, an adaptation of the speed of movement of the wiper drives may also take place. The wiper drive that remains below the desired specifications in the speed of movement may receive a higher PWM voltage; the wiper drive that experiences a speed of movement above the desired specifications may receive a lower PWM voltage.

In one embodiment, the control unit may comprise an event memory, in which events occurring during use, faults or other registrable items of information are stored. In this case, each event can be assigned a timestamp, in order that a time assignment is possible during an analysis of the events taking place at a later point in time. The timestamp may either be a real-time clock, a system time that is made available or else just an operating counter with a fixed time operation that is incremented during operation.

The idea on which the invention is based may also be implemented by software designed in accordance with the particular use for operating a windscreen wiper system. This software may be configured in machine language, a higher programming language or else in the form of a graphical programming language. The open-loop and closed-loop control logic may be based here as sequential control, as "state-machine" or based on a fuzzy control algorithm.

Figure 1:
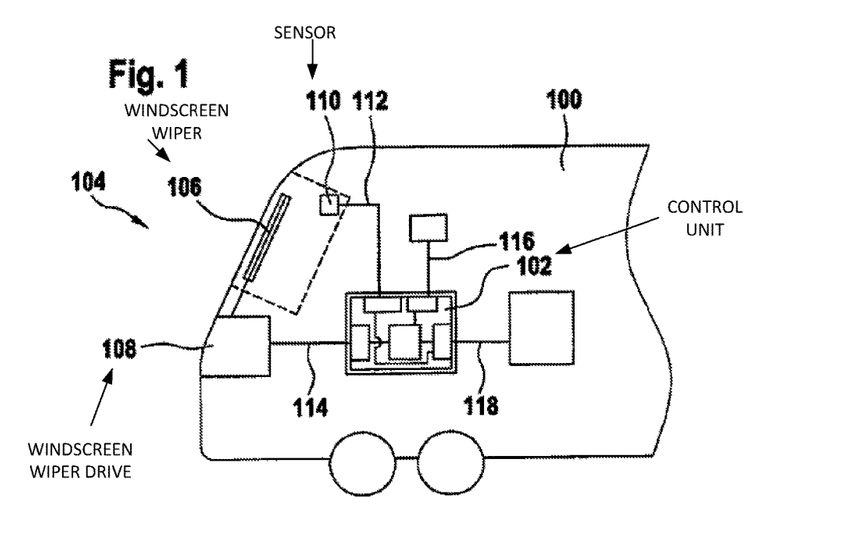
FIG. 1 shows a schematic representation of a rail vehicle with a control unit for a windscreen wiper system according to a disclosed embodiment.

FIG. 1 shows a schematic representation of a rail vehicle 100 with a control unit 102 for a windscreen wiper system 104 for the rail vehicle 100 according to a disclosed embodiment. The windscreen wiper system comprises a windscreen wiper 106 and also a drive 108, or a windscreen wiper drive 108. Depending on the exemplary embodiment, the drive 108 is an electrical or electropneumatic drive 108. In the case of the exemplary embodiment shown, a sensor 110 is arranged on a windscreen of the rail vehicle. In the exemplary embodiment shown, this is a rain sensor. The sensor 110 is designed for outputting a sensor signal 112. The sensor 110 is connected to an interface of the control unit 102, so that the sensor signal 112 lies at the control unit. An interface of the control unit 102 is connected to the drive 108 of the windscreen wiper system 104 in order to transmit a control signal 114. At an interface of the control unit 102 there is a signal which represents an item of information 116 about an operating mode of the windscreen wiper system 104. The signal representing the item of information 116 about an operating mode may be referred to as the operating mode signal 116. At an interface of the control unit 102 there is a supply voltage 118.

In a disclosed embodiment, a rain sensor 110 is used. For this there is in the wiped region on the windscreen of the rail vehicle 100 a sensor 110, which makes a signal 112 corresponding to the degree of wetting available. In a disclosed embodiment of the control unit 102, this function is also integrated along with the usual operating mode preselections.

In a disclosed embodiment, a sensing of the current position of the wiper arms 106 and the wiper blades 106 is carried out. In this stated exemplary embodiment, a position detection over the entire range of movement is integrated in the control unit 102 with a monitoring function for self protection.

In a disclosed embodiment, the functions required for the operation of windscreen wiper drives 108 are integrated in an electronic assembly 102 of their own. The control unit is supplied from the electrical system of the rail vehicle 100, while making allowance for the electrical properties that exist on these vehicles, including voltage fluctuations and EMC. The control unit 102 provides operating function inputs. In this case, the control unit is designed for processing continuous analog signals for sensing the position of the wiper shaft or wiper arm and wiper blade. A voltage-controllable output for supplying to the wiper motor—in 1-quadrant to 4-quadrant PWM pulse-width-modulated operation—provides a control signal 114. In this case, the control unit comprises a connection of at least one rain sensor. A disclosed embodiment of the control unit advantageously provides a configuration that is mechanically stable and suitable for use on LRV vehicles. In the application with electropneumatic wiper drives, multiple digital outputs for the connection of electropneumatic valves are provided instead of the PWM output.

Figure 2:
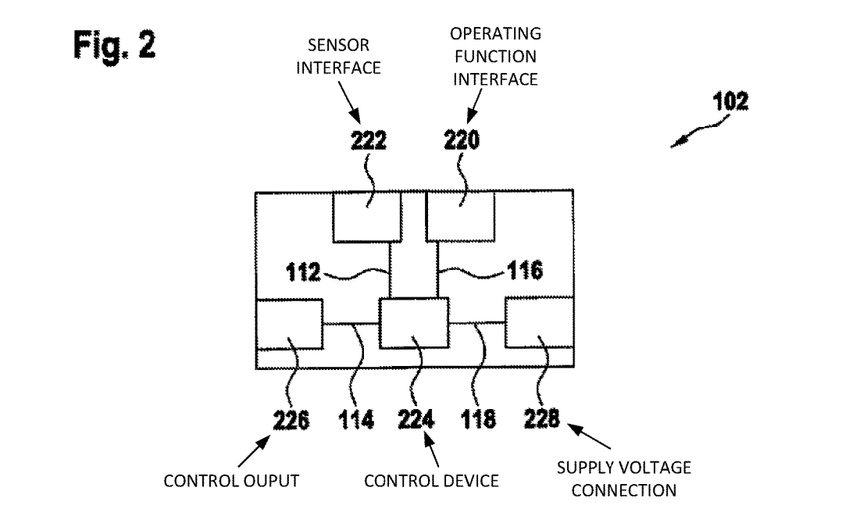
FIG. 2 shows a schematic representation of a control unit for a windscreen wiper system for a rail vehicle according to a disclosed embodiment.

FIG. 2 shows a schematic representation of a control unit 102 for a windscreen wiper system for a rail vehicle according to a disclosed embodiment. The control unit 102 may be a disclosed embodiment of a control unit 102 shown in FIG. 1 for a windscreen wiper system for a rail vehicle. The rail vehicle 100 and also the windscreen wiper system 104 may be a disclosed embodiment corresponding to FIG. 1. The control unit 102 comprises an operating function interface 220, a sensor interface 222, a control device 224, a control output 226 and also a supply voltage connection 228. The operating function interface 220, the sensor interface 222, the control output 226 and also the supply voltage connection 228 may be referred to in each case or together as an interface.

The operating function interface 220 is designed for receiving an item of information 116 about an operating mode of the windscreen wiper system. The sensor interface 222 is designed for receiving at least one analog and/or digital sensor signal 112. The control output 226 is designed for outputting a control signal 114. The supply voltage connection 228 is designed for providing an applied voltage 118 to the interfaces 220, 222, 226, 228 and at the same time or alternatively to the control device 224. The interfaces 220, 222, 226, 228 are connected to the control device 224. The control device 224 is designed for providing at least the control signal 114 for the windscreen wiper system by using the information 116 about the operating mode and in addition or alternatively the sensor signal 112.

In a disclosed embodiment, the control output 226 is designed for outputting at least one pulse-width-modulated signal as a control signal 114 in order to drive at least one electric motor. In a disclosed embodiment, the control output 226 is designed for outputting a plurality of digital signals in order to activate at least one solenoid valve of an electro-pneumatic windscreen wiper drive. At the same time, in a disclosed embodiment the control output 226 is designed for outputting both a pulse-width-modulated signal and a plurality of digital signals.

In a disclosed embodiment, the sensor interface 222 comprises at least one switchable supply connection for an angle of rotation sensor or for a rain sensor. In this case, the one supply voltage for the switchable supply connection can be provided by way of the control device 224 or directly by way of the supply voltage connection 228 at the sensor interface 222.

In a disclosed embodiment, the operating function interface 220 and at the same time or alternatively the sensor interface 222 are formed as a bus interface, in particular an LIN bus interface. In this case, in a disclosed embodiment the interfaces 220, 222 or 226 are as pure bus interfaces or alternatively as hybrid interfaces, which process both analog or digital signals and make possible a bus communication, for example by way of an LIN bus or CAN bus.

In a disclosed embodiment, the operating function interface 220 and in addition or alternatively the sensor interface 222 is designed for receiving at least one current signal of between 0 mA and 20 mA, a voltage signal and at the same time or alternatively at least one PWM signal and/or for evaluating them in accordance with an evaluation specification. If the signals received are digital signals, the control device 224 is designed for reading in the corresponding signals and extracting the information contained therein. If the signals received are analog signals, a corresponding logic for analog-digital conversion is provided between the corresponding interface 220, 222 and the control device 224, or alternatively the control device 224 has a corresponding analog-digital converter. In a disclosed embodiment, the same applies in the opposite direction to the control output 226, in a disclosed embodiment a control signal 114 that is provided by the control device 224 being passed by way of a digital-analog converter and then provided to the control output 226.

Figure 3:
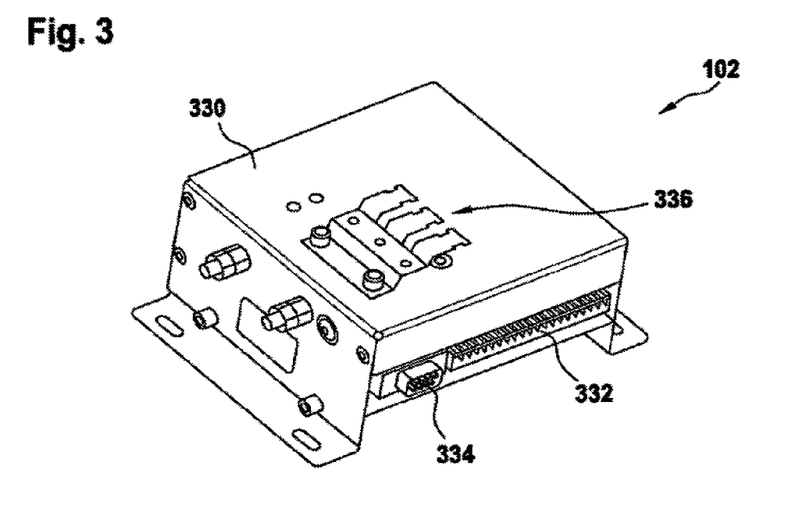
FIG. 3 shows a representation of a control unit for a windscreen wiper system according to a disclosed embodiment.

In a disclosed embodiment, the control unit 102 comprises a housing. A corresponding exemplary embodiment is represented in FIG. 3.

In a disclosed embodiment, multiple functions are combined in one assembly by the control unit 102. The control unit 102 consists here of two housing parts, which consist of steel sheet in a corrosion-protected configuration or of stainless steel; also see in this respect FIG. 3. Mounted on the base plate are the control electronics consisting of a populated conductor card. The conductor card has at least one plug-in connection. In the application as a control unit with a PWM output, typically two plug-in connectors are used; in the application as a control unit for electropneumatic drives, at least four plug-in connections are used. The number of plug-in connections may however be chosen and configured depending on the voltage levels and the requirements.

In the configuration as a control unit 102 with PWM, a plug-in connection makes the following connections available: connection of the supply to the battery system of the vehicle, digital inputs for choosing the operating mode (parking, interval stages, operation with the rain sensor, wiping at a number of speeds), the connection for the position sensor (angle of rotation sensor), supplying to the position sensor, the connection of the rain sensor and supplying to the rain sensor, and also the connection of the windscreen wiper motor in the form of a PWM (pulse-width modulated voltage).

In a disclosed embodiment, a second connector serves for the programming (flashing) of the operating program, and also the diagnostics with a data terminal (PC or notebook).

In a disclosed embodiment as a control unit 102 for electropneumatic drives, the supply is realized by a plug-in connection. With a further plug-in connection, the connection of the operating modes is performed. Connected to a third plug-in connection are the pneumatic valves, and a fourth connection is used for the contacting of the angle of rotation sensor and the rain sensor. The diagnostics are realized with preference by way of a diagnostic connector.

In dependence on the chosen operating mode, the control unit 102 may operate the drive motor of the windscreen wiper system in various modes. In the parking position, the motor is not supplied with voltage. No movement of the motor takes place.

In the interval mode, the motor is supplied with a defined PWM pulse pattern, so that the motor moves and moves the wiper arm over the front windscreen at a correspondingly lower speed. When the parking position is reached, the control unit switches off the PWM for the motor again. In the automatic or rain sensor operating mode, the signal coming from the rain sensor is evaluated. If there is appropriate wetting of the surface of the windscreen in the region of the sensor, the wiper is activated with a defined PWM pattern, so that the motor moves and moves the windscreen wiper over the surface of the windscreen. In the wiping operating mode, depending on the desired speed stage, the motor can be supplied with a defined PWM pattern, which moves the motor or the wiper arm at the various speeds over the surface of the windscreen.

In a disclosed embodiment, the angle of rotation sensor is in direct connection with the wiper arm. With preference, an angle of rotation sensor is used with a current signal. With preference, the angle from 0° to 360° is mapped onto the range of current values from 4 mA to 20 mA. By the definition of a value for the parking position and allowance being made for a capture range (tolerance range) which is dependent on the system and its dynamics, the control unit 102 is capable of guiding the wiper arm into the parking position and switching off the motor when the position is reached.

In a disclosed embodiment, using the angle of rotation sensor also makes it possible with the system to define any other position on the surface of the windscreen. This is particularly advantageous if, for the purpose of cleaning the front windscreen, the wiper arm is to be moved into the middle of the windscreen. The parking of the wiper arm at one of the two reversal positions is also in this way possible in terms of software.

When operating regional trains running with the drivers' cabs at the rear, it may be necessary that a midway position of the windscreen wiper is required in order to avoid lifting off of the wiper arm with the wiper blade being caused by unfavorable flow conditions in the lateral reversal or parking positions.

In a disclosed embodiment, the rain sensor is supplied with voltage by the control unit 102. Since rain sensors consist of infrared transmitting and receiving diodes and during operation these undergo an aging process with diminishing detection performance, it is advantageous for the purpose of increased system availability to supply these rain sensors with voltage only when the signal of the sensor is required. For this, the control unit has a switchable voltage supply. The rain sensor may make available either an analog signal or a PWM signal. The input of the control unit consists of a low-pass filter in order to make both forms of voltage possible for the further processing in the microcontroller.

In dependence on the wetting of the windscreen, the connected rain sensor delivers a variable voltage signal, which after analog/digital conversion has been performed is transformed by the operating software into the desired operating modes, such as for example wiping at various speeds.

If, instead of the analog or PWM signal as described above, the rain sensor has a digital bus connection, such as for example an LIN bus connection, then the control unit is configured with a corresponding LIN bus connection. The LIN bus is a data bus commonly encountered in the automotive sector for simple sensors and actuators, such as for example a rain sensor or wiper drives. LIN stands here for "Local Interconnect Network".

The connection and the operation of the windscreen wiper motor take place by way of the further connection terminals, which make a PWM-modulated voltage available. For a system design that meets EMC requirements, it is possible here both for the pulse width to be varied while the period is kept constant and for the period to be varied. The connected windscreen wiper motor may be a DC industrial motor, but also a classic windscreen wiper motor with only one pair of brushes. On account of the pulse duty factor of the PWM, the average voltage at the motor varies. In dependence on this average voltage, the motor then turns at a correspondingly lower or greater rotational speed.

It is also possible by use of the angle of rotation sensor to monitor the movement of the wiper arm, and consequently the rotational movement of the windscreen wiper drive. In this way, blockages of the wiper arm or hindrances can be detected immediately, long before the wiper motor overheats or suffers other damage.

By suitable wiring of two or more control units, it is also possible to allow synchronous operation of two or more windscreen wiper drives. Here it is possible in a simple configuration for a synchronization to be performed in specially designated positions, which with preference may be the reversal positions. The first windscreen wiper, which has been moved into this specially designated position, remains in this position until the second and third windscreen wipers have likewise reached this position. Only when all the drives have reached this synchronization position is the further movement of the windscreen wipers continued. If there is a hindrance of one or more windscreen wipers, solo operation or synchronized partial operation of the remaining windscreen wipers may also be carried out.

In a further configuration, synchronization of 2 or more windscreen wipers is also possible by means of adapted speeds of the individual systems by variation of the PWM signals. Here, the windscreen wiper that moves too slowly on the windscreen is activated with a higher PWM. Consequently, this windscreen wiper then receives a higher average voltage supply, which is manifested in a higher rotational speed and moves the windscreen wiper over the front windscreen with a correspondingly adapted higher speed of movement, and consequently leads to a synchronization of the systems. Windscreen wipers which have a speed of movement that is too high can be reduced in their rotational speed by a correspondingly modified PWM signal.

In a further configuration of a control unit, it may also be combined with an electropneumatic wiper drive. Here, instead of the PWM, the control unit has multiple digital outputs for the connection of pneumatic valves. In this configuration, the control unit again has the inputs described above for the operating modes, the angle of rotation sensor, the rain sensor and also the outputs described above, such as the voltage supply for the angle of rotation sensor and the activatable supply for the rain sensor, as well as the outputs to the solenoid valves and the information outputs to the vehicle control system.

FIG. 3 shows a representation of a control unit 102 for a windscreen wiper system in a housing 330 according to a disclosed embodiment. The control unit 102 may be a disclosed embodiment of a control unit 102 that is described in FIG. 1 and FIG. 2. In a disclosed embodiment, the housing 330 is produced here from steel sheet. In a disclosed embodiment, the housing 330 is produced from a stainless material. Depending on the exemplary embodiment, the housing 330 has a surface protection.

Arranged on one side of the housing 330 are a 20-pin connector 332 and also a sub-min-D connector 334 for diagnostics. The 20-pin connector 332 comprises the operating function interface, the sensor interface and also the control output. Arranged on another side of the housing 330 is a clip 336 for a shield support, a grounding screw and also a shield conducting screw.

Two opposite sides of the housing 330 have an outwardly bent portion, in each of which two longitudinal clearances are arranged. The longitudinal clearances are designed for fastening the housing 330 on a carrier.

Figure 4:
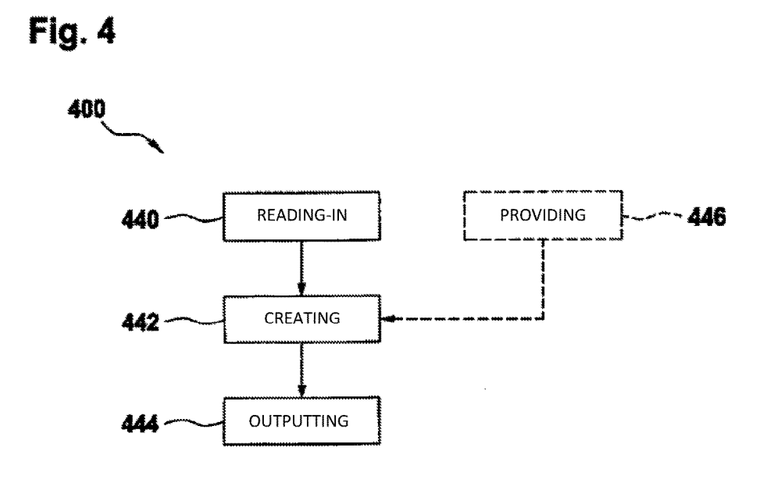
FIG. 4 shows a flow diagram of a method for operating a windscreen wiper system for a rail vehicle according to a disclosed embodiment.

FIG. 4 shows a flow diagram of a method 400 for operating a windscreen wiper system for a rail vehicle according to a disclosed embodiment. The windscreen wiper system may be a windscreen wiper system 104 shown in FIG. 1 for a rail vehicle 100. The method 400 comprises a operation 440 of reading in an operating mode signal, a operation 442 of creating a control signal and also a operation 444 of outputting the control signal. The operating mode signal represents an item of information about an operating mode to be controlled of the windscreen wiper system. In the creating operation 442, the control signal is created by using the operating mode signal. Depending on the exemplary embodiment, the control signal output in the outputting operation 444 is an analog, digital or analog-digital signal.

Optionally, in the reading-in operation 440 a sensor signal may be read in. If in the reading-in operation 440 a sensor signal is read in, in the creating operation 442 the control signal is created by using the sensor signal.

In a disclosed embodiment, the method 400 comprises an optional operation 446 of providing a supply voltage for a sensor. The sensor may be the sensor of which the sensor signal is read in in the reading-in operation 440.

In a disclosed embodiment, a variant of the method 400 that is described in FIG. 4 is implemented in a computer program product. The computer program product may be executed on a control device of a control unit for a windscreen wiper system that is described in FIG. 1 to FIG. 3.

Figure 5:
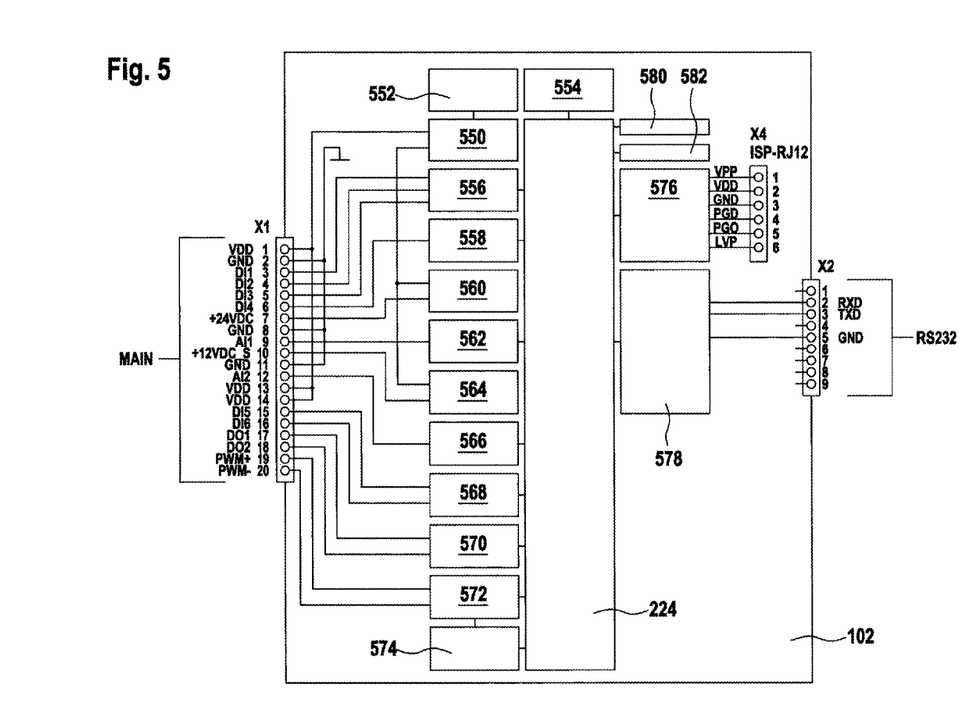
FIG. 5 shows a block diagram of a control unit for a windscreen wiper system according to a disclosed embodiment.

FIG. 5 shows a block diagram of a control unit 102 for a windscreen wiper system according to a disclosed embodiment. The windscreen wiper system may be the windscreen wiper system that is described in FIG. 1 and is denoted by the designation 104. At the center of the block diagram, the block 224 shows the control device 224 described in FIG. 2, which in the exemplary embodiment shown in FIG. 5 is represented as a microcontroller or as a CPU.

A block 550 represents a TVS/ESD filter with LD protection and a noise filter. The block 550 is connected to the block 552, which represents a voltage controller for a CPU. The block 552 is designed for providing 5 VDC or 50 mA. The block 552 is connected to a block 554, which represents a VDD monitor. The blocks 556-582 are all connected like the block 554 to the control device 224. The block 556 represents a digital input DI1, DI2, DI3 for a wiping-washing function. The block 558 represents a digital input DI4 for a washing function. The block 560 represents an additional voltage controller for 24 VDC and 100 mA. The block 562 represents an analog input AI1 for the windscreen wiper position. The analog input AI1 has a signal in the range between 4 mA and 20 mA. The block 564 represents a switched additional voltage controller for 12 VDC and 100 mA. The block 566 represents an analog input AI two for a rain sensor, this being formed as an open collector for a PWM signal.

The block 568 represents a digital input DI5, DI6 for a rain sensor with two speeds. The block 570 represents a static digital output DO1, DO2. The block 562 represents a power PWM signal with an EMC filter. The block 574 represents an NTC temperature monitor. The block 574 is also connected to the block 572. The block 576 represents a microchip with an ISP interface. The ISP interface is led to the outside by way of an RJ12 connection. The block 578 represents a serial interface, which is configured as a low-voltage RS-232 interface 334. The block 580 stands for a green status LED, the block 582 for a red status LED. From the blocks 550, 556-572, lines run to an interface denoted by MAIN 332. The interface denoted by MAIN 332 comprises the sensor interface and also the control output.

The block diagram shown in FIG. 5 represents inputs and outputs of a control unit for PWM operation of a windscreen wiper drive.

Figure 6:
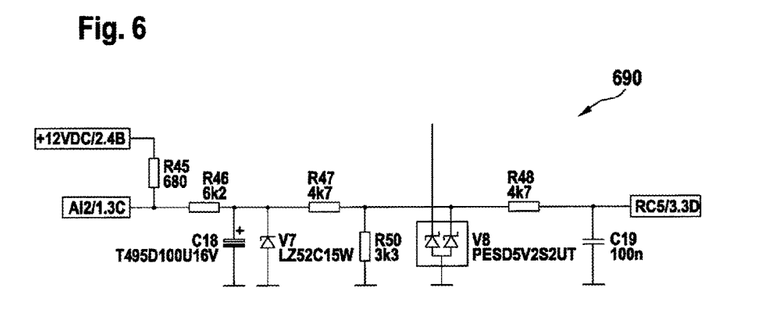
FIG. 6 shows a circuit diagram of an input wiring for an evaluation of a rain sensor for a control unit according to a disclosed embodiment.

FIG. 6 shows a circuit diagram of an input wiring 690 for an evaluation of a rain sensor for a control unit according to a disclosed embodiment. The rain sensor and the control unit may be exemplary embodiments of the components shown in FIG. 1. The input wiring shown in FIG. 6 for an evaluation of the rain sensor consists of a low-pass filter and a protective wiring of the microcontroller input. In this case, the microcontroller input is understood as meaning a sensor interface of a control unit shown in FIG. 1 or alternatively an input of a control device shown in FIG. 2 in the form of a microcontroller or a CPU.

The low-pass filter may be an R-C combination of the resistor of 46 with the capacitor C18. The protective wiring of the microcontroller input comprises the remaining components represented.

Arranged between a 12-V input and the analog input AI2 is the resistor R45 with 680 ohms. Arranged in a series between the analog input AI2 and the microcontroller input RC5 are three resistors R46, R47, R48. The resistor R46 has a resistance of 6.2 kiloohms. The resistors R47 and R48 have in each case a resistance of 4.7 kiloohms. The connection between the two resistors R46 and R47 is respectively connected to ground by way of a capacitor C18 and a diode V7. Attached between the resistor R48 and the microcontroller input RC5 is a capacitor C19 with 100 nanofarads that is connected to ground. Connected to the connection between the resistors R47 and R48 are a resistor R50 with 3.3 kiloohms and a diode V8, the latter R50, V8 also being connected to ground.

Figure 7:
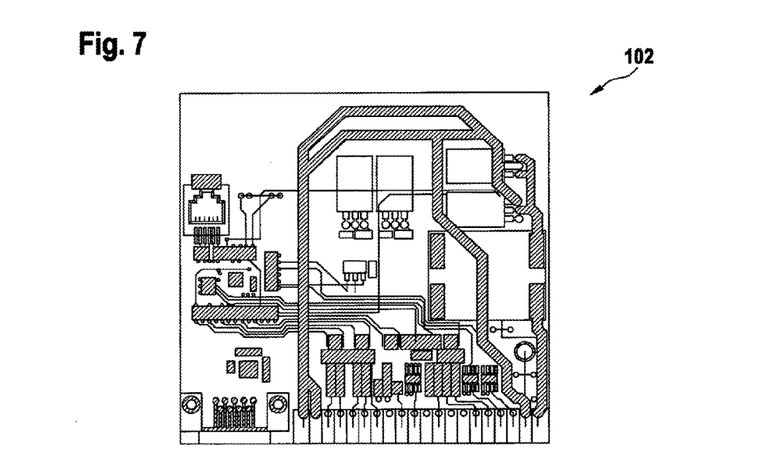
FIG. 7 shows a circuit board layout for a control unit for a windscreen wiper system according to a disclosed embodiment.

FIG. 7 shows a circuit board layout for a control unit 102 for a windscreen wiper system according to a disclosed embodiment. The control unit 102 may be a disclosed embodiment of a control unit 102 described in FIG. 1 to FIG. 3 or FIG. 5. The windscreen wiper system may be the windscreen wiper system 104 for a rail vehicle that is denoted by the designation 104 and described in FIG. 1. The circuit board layout shown in FIG. 7 is suitable for a control unit 102 for a pulse-width-modulated operated windscreen wiper drive of a windscreen wiper system. Consequently, FIG. 7 shows a disclosed embodiment of a control unit 102 for an electrically operated windscreen wiper drive.

Figure 8:
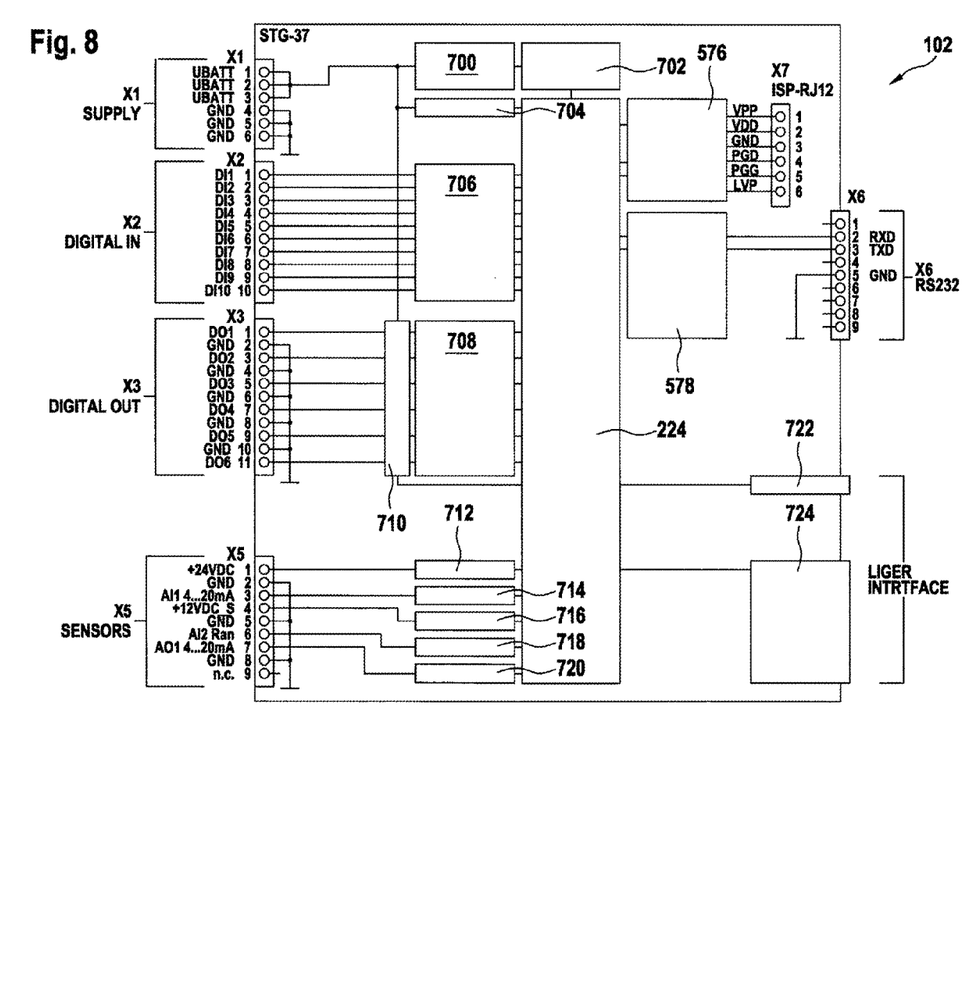
FIG. 8 shows a block diagram of a control unit for a windscreen wiper system according to a disclosed embodiment.

FIG. 8 shows a block diagram of a control unit 102 for a windscreen wiper system according to a disclosed embodiment. The control unit 102 may be a disclosed embodiment of a control unit 102 described in FIG. 1 to FIG. 3, FIG. 5 or FIG. 7. The windscreen wiper system may be a disclosed embodiment of a windscreen wiper system 104 described in FIG. 1. The block diagram shown in FIG. 8 shows a disclosed embodiment with inputs and outputs for a control unit 102 for operation on an electropneumatic windscreen wiper drive. Arranged around the control device 224 configured as a CPU or microcontroller are the interfaces characterizing the control unit 102, the interfaces being connected to the control device 224 by way of blocks.

X6 denotes an interface formed as an RS-232 interface, which is connected to the control device 224 by way of the block 578; the interface X7 is connected to the control device 224 by way of the block 506. 70, providing a microchip-ISP interface.

The block 700 represents a DC/DC converter, which converts 110 V of direct voltage into 24 V of direct voltage. The block 700 is connected to a further voltage controller, which is represented by the block 702, 5 V of direct voltage being fed to the control device 224 by way of the voltage controller 5. The block 704 represents a supply voltage monitor, which is connected parallel to the block 700. The block 700 is connected to the interface X1, which corresponds to the supply voltage connection 228 with reference to the exemplary embodiment represented in FIG. 2. The block 706 represents a digital input for 110 V and is connected to the digital input X2 or the digital input lines DI1 to DI10. The block 708 represents a digital output for 110 V and is connected to the interface X3, which comprises the digital outputs DO1 to DO6. For each digital output DO1 to DO6, a corresponding ground connection is available. Arranged between the block 708 and the interface X3 is a block 710, which represents an output monitor.

The sensor interface X5 is connected to the blocks 712-720. The block 712 represents an analog output with 24 V of direct voltage. The block 714 represents an analog current input AI1 for 4 mA to 20 mA. The block 716 represents an analog output with 12 V of direct voltage. The block 718 represents an analog input for a rain sensor. The block 720 represents an analog output for a range from 4 mA to 20 mA. The blocks 722 and 724 concern a user interface. The block 722 represents a key input. The block 724 represents a driver stage for an LED array.

Figure 9:
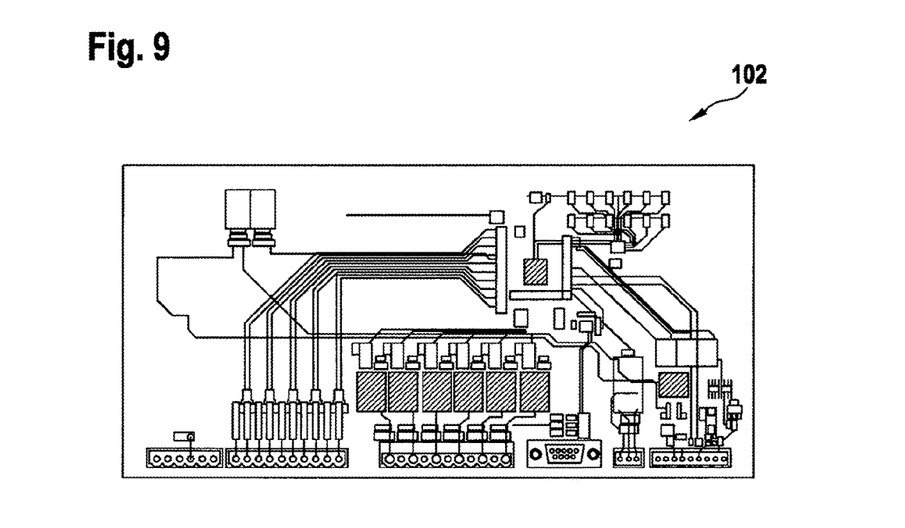
FIG. 9 shows a circuit board layout for a control unit for a windscreen wiper system according to a disclosed embodiment.

FIG. 9 shows a circuit board layout for a control unit for a windscreen wiper system according to a disclosed embodiment. The control unit 102 may be a disclosed embodiment of a control unit 102 described in FIG. 1 to FIG. 3, FIG. 5 or FIG. 7. The windscreen wiper system may be a disclosed embodiment of a windscreen wiper system 104 described in FIG. 1. The circuit board layout shown in FIG. 9 is a circuit board layout for a control unit for an electropneumatic windscreen wiper drive.

Figure 10:
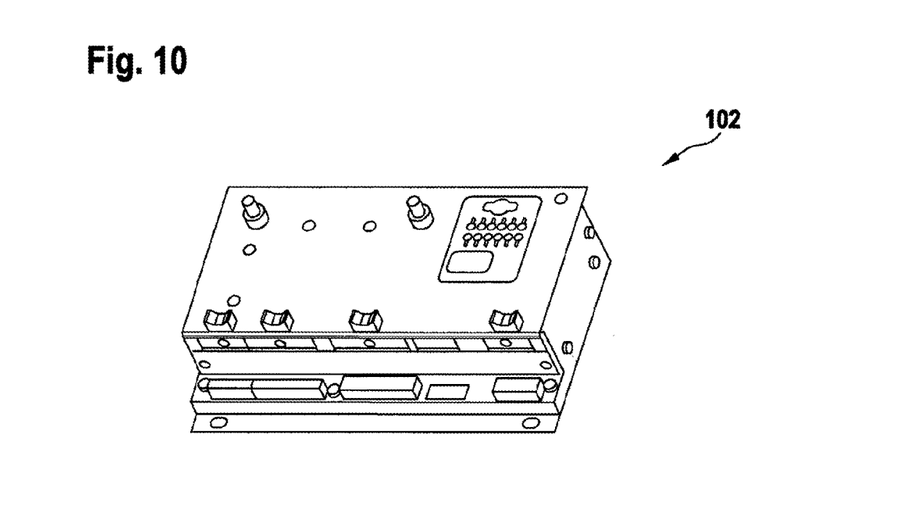
FIG. 10 shows a representation of a control unit for a windscreen wiper system in a housing according to a disclosed embodiment.

FIG. 10 shows a representation of a control unit for a windscreen wiper system in a housing according to a disclosed embodiment. The control unit 102 may be a disclosed embodiment of a control unit 102 described in FIG. 1 to FIG. 3, FIG. 5 or FIG. 7. The windscreen wiper system may be a disclosed embodiment of a windscreen wiper system 104 described in FIG. 1. The control unit 102 represented in FIG. 10 in a housing 330 has four plug-in connectors, a diagnostics connection 334, an LED right display, cable fixings, a fastening possibility for cable screens and also for fastening screws for a ground connection and a screen connection. The four plug-in connectors serve as a mechanical connection for an operating function interface, a sensor interface, a control output and also for the supply voltage connection, as they are represented in FIG. 2.

The exemplary embodiments described are only chosen by way of example and can be combined with one another.

LIST OF DESIGNATIONS

| | |
|---|---|
| 100 | Rail vehicle |
| 102 | Control unit |
| 104 | Windscreen wiper system |
| 106 | Windscreen wiper |
| 108 | Drive, windscreen wiper drive |
| 110 | Sensor |
| 112 | Sensor signal |
| 114 | Control signal |
| 116 | Information about operating mode, operating mode signal |
| 118 | Supply voltage, applied voltage |
| 220 | Operating function interface |
| 222 | Sensor interface |
| 224 | Control device |
| 226 | Control output |
| 228 | Supply voltage connection |
| 330 | Housing |
| 332 | 20-pin connector |
| 334 | Sub-Min-D connector |
| 336 | Clip for a screen support |
| 400 | Method for operating a windscreen wiper system |
| 440 | Reading-in operation |
| 442 | Creating operation |
| 444 | Outputting operation |
| 446 | Providing operation |
| 550-582 | Blocks of a control unit |
| 690 | Input wiring |
| R45 | Resistor |
| R46 | Resistor |
| R47 | Resistor |
| R48 | Resistor |
| R50 | Resistor |
| C18 | Capacitor |
| C19 | Capacitor |
| V7 | Diode |
| V8 | Diode |
| 700-724 | Blocks of a control unit |

The invention claimed is:

1. A control unit for a windscreen wiper system for a rail vehicle, the control unit comprising:
an operating function interface designed for receiving an item of information about an operating mode of the windscreen wiper system;
a sensor interface designed for receiving at least one analog and/or digital sensor signal;
a control device designed for providing at least one control signal for the windscreen wiper system by using the information about the operating mode and the sensor signal;
a control output designed for outputting the at least one control signal; and
a supply voltage connection designed for providing an applied voltage to the interface and the device of the control unit,
wherein the sensor interface comprises at least one switchable supply connection coupled to an angle of rotation sensor and a rain sensor,
wherein the at least one switchable supply connection alternately switches the supply voltage connection between each of the angle rotation sensor and the rain sensor, and
wherein the operating function interface and the sensor interface is an LIN bus interface.

2. The control unit of claim 1, wherein the control output is configured to output at least one pulse-width-modulated signal to drive at least one electric motor and/or an electrical windscreen wiper drive, and/or output a plurality of digital signals to activate at least one solenoid valve of an electropneumatic windscreen wiper drive.

3. The control unit of claim 1, wherein the operating function interface and the sensor interface is designed for receiving at least one current signal of between 0 mA and 20 mA and at least one voltage signal and at least one PWM signal and/or for evaluating each received signal in accordance with an evaluation specification.

4. The control unit of claim 1, wherein the control unit has a housing, the housing being produced from steel sheet and/or from stainless material and/or having a surface protection.

5. The control unit of claim 1, wherein the angle of rotation sensor is in direct connection with a wiper arm of the windscreen wiper system and uses a current signal to determine an angle of rotation anywhere between 0 and 360 degrees of the wiper arm.

6. A method for operating a windscreen wiper system for a rail vehicle, the method comprising:
reading-in an operating mode signal, the operating mode signal representing an item of information about an operating mode of the windscreen wiper system to be controlled;
creating a control signal using the operating mode signal;
outputting the control signal to the windscreen wiper system as an analog and/or digital signal; and
driving the windscreen wiper system via the control signal,
wherein the operating mode includes a parking, interval with multiple stages, wiping with multiple stages, rain sensor operation, and continuous operation,
wherein, in the reading-in, a sensor signal is also read in, and wherein the creating the control signal is created by using the sensor signal, wherein the sensor signal is read in based on the output at least one switchable supply connection which alternately switches the supply voltage connection between each of the angle rotation sensor and the rain sensor.

7. The method of claim 5, further comprising providing a supply voltage for a sensor.

8. A non-transitory computer program product with program code for carrying out a method for operating a windscreen wiper system for a rail vehicle, the method comprising:
reading-in an operating mode signal, the operating mode signal representing an item of information about an operating mode to be controlled of the windscreen wiper system, and
creating a control signal using the operating mode signal, and outputting the control signal to the windscreen wiper system as an analog and/or digital signal when the computer program product is executed on a control unit for a windscreen wiper system for a rail vehicle, wherein an operating function interface is configured to receive an item of information about the operating mode of the windscreen wiper system, wherein a sensor interface is configured to receive at least one analog and digital sensor signal, wherein a control device is configured to provide at least one control signal for the windscreen wiper system by using the information about the operating mode and the sensor signal, wherein a control output is configured to output the at least one control signal, wherein a supply voltage connection is configured to provide an applied voltage to the interfaces and the device of the control unit, wherein the sensor interface comprises at least one switchable supply connection coupled to an angle of rotation sensor and a rain sensor, wherein the at least one switchable supply connection alternately switches the supply voltage connection between each of the angle rotation sensor and the rain sensor, and wherein the operating function interface and the sensor interface is a LIN bus interface.

9. The computer program product with program code of claim 8, wherein the control output is configured to output at least one pulse-width-modulated signal to drive at least one electric motor and/or an electrical windscreen wiper drive, and/or to output a plurality of digital signals to activate at least one solenoid valve of an electropneumatic windscreen wiper drive.

10. The computer program product with program code control unit of claim 8, wherein the operating function interface and the sensor interface is configured to receive at least one current signal of between 0 mA and 20 mA and at least one voltage signal and at least one PWM signal and configured to evaluate each received signal in accordance with an evaluation specification.

11. The computer program product with program code control unit of claim 8, wherein the control unit has a housing, the housing being produced from steel sheet and/or from stainless material and/or having a surface protection.

12. The computer program product with program code control unit of claim 8, the method further comprising:
reading-in an operating mode signal, the operating mode signal representing an item of information about an operating mode of the windscreen wiper system to be controlled;
creating a control signal using the operating mode signal; and
outputting the control signal to the windscreen wiper system as an analog and/or digital signal.

13. The computer program product with program code control unit of claim 8, wherein, in the reading-in of an operating mode signal, a sensor signal is also read in, and wherein, the control signal is created using the sensor signal.

14. The computer program product with program code control unit of claim 8, further comprising providing a supply voltage for a sensor.

* * * * *